(12) United States Patent
Dittmar

(10) Patent No.: US 7,132,025 B2
(45) Date of Patent: Nov. 7, 2006

(54) METHOD OF PRODUCING A THICK, THERMOFORMABLE, FIBER-REINFORCED SEMI-FINISHED PRODUCT

(75) Inventor: Harri Dittmar, Battenberg (DE)

(73) Assignee: Quadrant Plastic Composites AG, Lenzburg (CH)

( * ) Notice: Subject to any disclaimer, the term of this patent is extended or adjusted under 35 U.S.C. 154(b) by 129 days.

(21) Appl. No.: 10/472,530

(22) PCT Filed: Mar. 9, 2002

(86) PCT No.: PCT/EP02/02608

§ 371 (c)(1),
(2), (4) Date: Oct. 24, 2003

(87) PCT Pub. No.: WO02/076711

PCT Pub. Date: Oct. 3, 2002

(65) Prior Publication Data

US 2004/0112501 A1    Jun. 17, 2004

(30) Foreign Application Priority Data

Mar. 24, 2001   (DE)   ................ 101 14 553

(51) Int. Cl.
 B32B 31/20       (2006.01)
 D04H 1/54        (2006.01)
(52) U.S. Cl. ............... 156/148; 156/229; 264/122; 28/107
(58) Field of Classification Search ............... None
 See application file for complete search history.

(56) References Cited

U.S. PATENT DOCUMENTS

| | | |
|---|---|---|
| 3,063,883 A | 11/1962 | Brissette |
| 3,616,031 A | 10/1971 | Fleissner |
| 3,876,745 A | 4/1975 | Fleissner |
| 4,195,112 A | 3/1980 | Sheard et al. |
| 4,199,635 A | 4/1980 | Parker |
| 4,258,093 A | 3/1981 | Benedyk |
| 4,418,031 A | 11/1983 | Doerer et al. |
| 4,424,250 A | 1/1984 | Adams et al. |
| 4,501,856 A | 2/1985 | Harpell et al. |
| 4,543,288 A | 9/1985 | Radvan et al. |
| 4,568,581 A | 2/1986 | Peoples, Jr. |
| 4,582,554 A | 4/1986 | Bell et al. |
| 4,670,331 A | 6/1987 | Radvan et al. |
| 4,690,860 A | 9/1987 | Radvan et al. |
| 4,734,321 A | 3/1988 | Radvan et al. |
| 4,780,359 A | 10/1988 | Trask et al. |
| 4,882,114 A | 11/1989 | Radvan et al. |
| 4,929,496 A * | 5/1990 | Daimon et al. ............. 442/187 |
| 4,948,661 A | 8/1990 | Smith et al. |
| 4,978,489 A | 12/1990 | Radvan et al. |
| 5,134,016 A | 7/1992 | Geary, Jr. et al. |
| 5,145,626 A | 9/1992 | Bastioli et al. |
| 5,164,141 A | 11/1992 | Becker et al. |
| 5,298,319 A * | 3/1994 | Donahue et al. ............. 442/388 |
| 5,492,580 A | 2/1996 | Frank |
| 5,721,177 A | 2/1998 | Frank |
| 5,841,081 A * | 11/1998 | Thompson et al. ......... 181/286 |
| 2001/0032696 A1 | 10/2001 | Debalme et al. |

FOREIGN PATENT DOCUMENTS

| | | |
|---|---|---|
| DE | 36 14 533 A1 | 11/1987 |
| DE | 101 05 813 A1 | 8/2002 |
| EP | 0 555 345 B1 | 9/1996 |
| EP | 0 593 716 | 10/1998 |
| FR | 2 743 822 A1 | 7/1997 |
| WO | WO 88/09406 | 12/1988 |
| WO | WO 98/35086 A1 | 8/1998 |
| WO | WO 01/32405 A1 | 5/2001 |

* cited by examiner

Primary Examiner—Sam Chuan Yao
(74) Attorney, Agent, or Firm—Brooks Kushman P.C.

(57) ABSTRACT

The invention relates to a continuous method of producing a thick, thermoformable, from a thermoplastic material and reinforcing fibers. The inventive method comprises the following steps: A) blending thermoplastic fibers and reinforcing fibers to give a dry-laid blended web, B) consolidating the blended web by needle felting, C) heating the consolidated blended web, and D) compacting it to give a semi-finished product.

10 Claims, No Drawings

METHOD OF PRODUCING A THICK, THERMOFORMABLE, FIBER-REINFORCED SEMI-FINISHED PRODUCT

BACKGROUND OF THE INVENTION

1. Field of the Invention

The invention relates to a method for producing a thick, thermoplastically deformable fiber-reinforced semifinished product from a mixed non-woven in which thermoplastic fibers and reinforcing fibers are present.

2. Description of the Related Art

Thermoplastically deformable semifinished products which comprise reinforcing fibers, in particular glass fibers, are increasingly used for producing moldings, in particular for motor vehicle parts. These "plastic panels" have high toughness and strength. The semifinished GMT products are produced on a large industrial scale by uniting continuous glass mats and webs of thermoplastic melt on a twin-belt press. However, this mode of operation is energy-intensive, because the high-viscosity melt has to be pressed into the mat. Fiber contents of more than 50% by weight are rarely achievable by this method. Since the glass mats are generally composed of fiber bundles, the saturation process is never entirely complete and uniform, the result being the occurrence of regions of microscopic inhomogeneity, leading to high standard deviations of mechanical properties.

Another process used in industry is similar to papermaking. Thermoplastic fibers and reinforcing fibers are mixed with one another in the form of an aqueous slurry, the slurry is squeezed, and the resultant mixed non-woven is dried and hot-pressed. This involves large amounts of water, and the purification of waste water contaminated with auxiliaries.

DE-A 36 14 533 describes a process for producing moldings from thermoplastics which comprise an inserted reinforcement. This is similar to textile fiber technology in that a mixed non-woven composed of thermoplastic fibers and reinforcing fibers is produced by the carding or airlay process and, for example, consolidated by needling. Cut-to-size pieces from this mixed non-woven are heated and are directly, with no prior consolidation, pressed to give three-dimensional moldings. However, complete and thorough saturation is rarely achieved here, especially in the case of components of complicated shape, and the mechanical properties of the moldings are therefore unsatisfactory.

U.S. Pat. No. 4,948,661 describes the production of a consolidated semifinished product whose thickness is from 1.25 to 2.5 mm. First, a dry process produces a mixed non-woven from thermoplastic fibers and reinforcing fibers. However, this mixed non-woven is not needled, but is folded together in the manner of corrugations, and is consolidated directly through hot-pressing to give the semifinished product. Because there is no consolidation of the mixed non-woven, the only practical problem-free consolidation method is batchwise consolidation. Although mention is also made of continuous consolidation on a twin-belt press, this would be associated with the disadvantages described above—if indeed it is feasible in practice.

Finally, EP-A 555 345 describes an air-permeable fiber structure made from a mixed non-woven produced by a wet or dry method and composed of thermoplastic fibers and reinforcing fibers. This mixed non-woven, which has not been needled, is partially consolidated by careful incipient melting of the thermoplastic fibers, by bonding these to the reinforcing fibers at the intersections. Continuous production of the fiber structure is not described. Another disadvantage of the process is that the non-wetted reinforcing fibers can corrode during storage, and here again it is difficult to obtain complete and thorough saturation during the production of moldings.

The German patent application P 101 05 813.6 describes a process for producing a thermoplastically deformable, fiber-reinforced semifinished product with a thickness of from 0.2 to 3.0 mm, by needling a mixed non-woven composed of thermoplastic fibers and of reinforcing fibers of length from 30 to 300 mm, and heating the mixed non-woven, and pressing it on a calender or in a polishing stack. If the intention is to press this relatively thin semifinished product to produce finished parts with a complicated three-dimensional shape, in particular those having filigree ribs, the ribs are found not to have a satisfactory filling of fibers. In the case of a thicker semifinished product, improved flowability should be assumed.

SUMMARY OF THE INVENTION

An object of the present invention was then to develop a continuous process for producing a relatively thick semifinished product from a thermoplastic and reinforcing fibers, the semifinished product being capable of forming to give finished parts which, in all directions, have mechanical properties which are excellent and highly reproducible.

DETAILED DESCRIPTION OF THE PREFERRED EMBODIMENTS

The inventive method achieves this object. This encompasses the following steps of the process:

A) dry-mixing thermoplastic fibers and individual, non-bonded synthetic reinforcing fibers with one another, using the carding process or the airlay process. Thermoplastics which may be used are any of the spinnable thermoplastics, e.g. polyolefins, such as polyethylene and polypropylene, polyamides, linear polyesters, thermoplastic polyurethanes, polycarbonate, polyacetals, and also corresponding copolymers and mixture, and moreover high-temperature-resistant polymers, such as polyarylates, polysulfones, polyetherimides, polyimides and polyether ketones. Polypropylene is particularly preferred. The corresponding fibers may be produced by spinning the thermoplastic melts or spinning solutions of the thermoplastics. The average length of the thermoplastic fibers is generally from 10 to 200 mm. To give the semifinished product good flowability, the melt index of the thermoplastic should be relatively high. In the case of polypropylene, the MFI (230° C., 2.16 kp) to DIN 53735 should be greater than 300 g/10 min, and preferably from 400 to 1 000 g/10 min.

Preferred reinforcing fibres are glass fibers, and besides these use may also in principle be made of carbon fibers and aramid fibers. The average length of the reinforcing fibers used is from 20 to 80 mm, preferably from 25 to 50 mm. These short fibers flow during the pressing process, even into thin regions of the mold. In order that they have good miscibility with the thermoplastic fibers, they have to be present in the form of individual, non-bonded fibers, and this means that they must not have been bonded by polymeric binders.

The thermoplastic fibers and reinforcing fibers are dry-mixed with one another in a ratio by weight of from 10:90 to 80:20, preferably 25:75 to 55:45, by the carding process or airlay process known from textile technology. This gives a mixed non-woven in the form of a continuous web.

B. The resultant mixed non-woven is consolidated by needling. This may take place on conventional needlelooms, using felting needles. The needling firstly causes some breakage of the reinforcing fibers, thus reducing the average fiber length; secondly, individual fibers are drawn through the non-woven, therefore becoming oriented perpendicularly to the principal surface, with capability to exert reinforcing action in this direction in the finished part. In addition, these perpendicularly oriented fibers cause the semifinished product to expand in the z direction on heating. This "loft" can be utilized to produce lightweight components via partial consolidation. Finally, the inventive needling consolidates the mixed non-woven, which can therefore be handled without difficulty in the subsequent steps of the process.

In one specific embodiment of the invention, the needled mixed non-woven is stretched in one direction. As a result of this, the reinforcing fibers also have this orientation in the finished part, thus bringing about a particularly high level of mechanical properties in this direction.

C) The consolidated mixed non-woven is heated in a convection oven or by IR radiation to temperatures above the softening point of the thermoplastic. The preferred extent to which the temperature should be above the softening point is from 20 to 60° C.; in the case of polypropylene fibers, the temperature is preferably from 180 to 220° C., in particular from 190 to 210° C.

D) The heated mixed non-woven is then immediately pressed in a laminating device, in a polishing stack, or on a calender. A laminating device is a twin-belt press which however—unlike conventional GMT twin-belt presses—does not have steel belts, but has belts composed of polymer-coated, preferably Teflon-coated, fabric composed of glass or of aramid, and in which the pressures used are substantially lower, from 1 to 10 bar. According to the invention, the thickness of the resultant semifinished sheet is more than 3.0 mm, preferably from 3.2 to 10.0 mm. The average length of the reinforcing fibers in the semifinished product is from 10 to 60 mm, and the fibers preferably have an average length of more than 50 mm.

E) In one preferred embodiment of the invention, during the pressing process, functional layers are brought in contact with one or both sides of the heated mixed non-woven and concomitantly pressed. These may be decorative layers, thin fiber non-wovens, thermoplastic films or webs of fabric. It is also possible, in principle, to delay application of the functional layers until production of the molding has begun.

The semifinished product produced according to the invention may be separated into customer-specific cut-to-size pieces, and stacked on pallets, and shipped. It may then be thermoplastically deformed to give three-dimensional finished parts. For this, appropriate cut-to-size pieces are heated to temperatures above the softening point of the thermoplastic, and pressed in conventional two-part molds, or deformed by thermoforming. Since the semifinished product is relatively thick and comprises short fibers, these flow during the pressing process, even in fine regions of the mold, making it possible to produce finished parts with a complicated three-dimensional shape, and in particular with filigree ribs. The finished parts may be used in the transport sector as interior parts for automobiles, for railway equipment, and for aircraft, or else as bodywork parts, as large-surface-area panels, or else as furniture parts.

What is claimed is:

1. A continuous process for producing a thermoformable fiber reinforced semifinished product, comprising the following steps in the order given:
    a) dry blending from 10 to 80 percent by weight of thermoplastic fibers having an average length of between 20 mm and 80 mm with from 90 to 20 weight percent of reinforcing fibers comprising at least one of glass fibers and carbon fibers by an airlay or carding process to form a continuous non-woven web, said weight percents based upon the total weight of the web, said reinforcing fibers having an average length of from 10 to 60 mm;
    b) needling the web with felting needles to provide a needled web having an increased orientation of reinforcing fibers perpendicular to the surface of the needled web;
    c) heating the consolidated web to a temperature above the softening point of the thermoplastic fibers to form a heated web;
    d) compressing the heated web in a continuous fashion at a pressure of from 1 to 10 bar to provide a compressed and partially consolidated thermoformable semifinished product having a thickness greater than 3 mm, wherein the thermoplastic is polypropylene having a melt viscosity MFI (230° C., 2.16 kp) to DIN 73735 of greater than 300 g/10 min.

2. The process of claim 1, wherein a thermoplastic film is laminated to at least one side of the heated web during said step of compressing.

3. The process of claim 1, wherein a thermoplastic film is laminated to both sides of the heated web during said step of compressing.

4. The process of claim 1, wherein the thickness of the thermoformable semifinished product is less than 10 mm.

5. The process of claim 1, wherein the average length of the reinforcing fibers is from 25 to 60 mm.

6. The process of claim 1, wherein the reinforcing fibers consist essentially of glass fibers.

7. A continuous process for producing a thermoformable fiber reinforced semifinished product, comprising the following steps in the order given:
    a) dry blending from 10 to 80 percent by weight of thermoplastic fibers having an average length of between 20 mm and 80 mm with from 90 to 20 weight percent of reinforcing fibers comprising at least one of glass fibers, carbon fibers, and aramid fibers by an airlay or carding process to form a continuous non-woven web, said weight percents based upon the total weight of the web, said reinforcing fibers having an average length of from 10 to 60 mm;
    b) needling the web with felting needles to provide a needled web having an increased orientation of reinforcing fibers perpendicular to the surface of the needled web;
    c) stretching the needled web in one direction to provide an increased orientation of fibers in that direction;
    d) heating the needled web to a temperature above the softening point of the thermoplastic fibers to form a heated web;
    e) compressing the heated web in a continuous fashion at a pressure of from 1 to 10 bar to provide a compressed and partially consolidated thermoformable semifinished product having a thickness greater than 3 mm, and
    f) heating the thermoformable semifinished product of step d) and allowing the product to expand in the thickness direction to produce a thermoformable semifinished product having a thickness greater than before heating in step f).

8. The process of claim 7, wherein a thermoplastic film is laminated to at least one side of the heated web during said step of compressing.

9. The process of claim 7, wherein the thickness of the thermoformable semifinished product is less than 10 mm.

10. The process of claim 7, wherein the reinforcing fibers consist essentially of glass fibers.

* * * * *